United States Patent [19]
Heske, III et al.

[11] Patent Number: 5,327,431
[45] Date of Patent: Jul. 5, 1994

[54] METHOD AND APPARATUS FOR SOURCE ROUTING BRIDGING

[75] Inventors: Theodore Heske, III, Centerville; Peter J. Kulik, Dayton, both of Ohio

[73] Assignee: NCR Corporation, Dayton, Ohio

[21] Appl. No.: 70,647

[22] Filed: Jun. 1, 1993

Related U.S. Application Data

[63] Continuation of Ser. No. 382,605, Jul. 19, 1989, abandoned.

[51] Int. Cl.$^5$ .......................................... H04L 12/42
[52] U.S. Cl. .................................. 370/85.5; 370/85.13
[58] Field of Search ................. 370/85.5, 85.12, 85.13, 370/85.14, 85.15, 94.1, 60, 62; 340/825.05, 825.5

[56] References Cited

U.S. PATENT DOCUMENTS

| | | | |
|---|---|---|---|
| 4,489,379 | 12/1984 | Lanier et al. | 364/200 |
| 4,539,679 | 9/1985 | Bux et al. | 370/85.14 |
| 4,621,359 | 11/1986 | McMillen | 370/60 |
| 4,621,362 | 11/1986 | Sy | 370/85.14 |
| 4,627,052 | 12/1986 | Hoare et al. | 370/85.13 |
| 4,663,748 | 5/1987 | Karbowiak et al. | 370/85.6 |
| 4,672,607 | 6/1987 | Nakayashiki et al. | 370/85.14 |
| 4,680,756 | 7/1987 | Sugimoto et al. | 370/85.14 |
| 4,750,114 | 6/1988 | Hirtle | 364/200 |
| 4,752,924 | 6/1988 | Darnell et al. | 340/825.01 |
| 4,796,293 | 1/1989 | Blinken et al. | 370/62 |
| 4,809,265 | 2/1989 | Hart et al. | 370/85.13 |
| 4,811,009 | 3/1989 | Orimo et al. | 340/825.05 |
| 4,901,312 | 2/1990 | Hui et al. | 370/85.12 |
| 5,018,133 | 5/1991 | Tsukakoshi et al. | 370/85.6 |
| 5,074,764 | 1/1992 | Orita et al. | 370/85.13 |

FOREIGN PATENT DOCUMENTS

| | | | |
|---|---|---|---|
| 0073840 | 3/1989 | Japan | 370/85.14 |
| 0010951 | 1/1990 | Japan | 370/85.14 |

OTHER PUBLICATIONS

Dixon et al., "Source routing bridges: Addressing, bridging & source routing", IEEE Network, vol. 2, No. 1, Jan. 1988, New York, pp. 25-32.

Hamner et al., "Source routing bridge implementation", IEEE Network, vol. 2, No. 1, Jan. 1988, New York, pp. 33-36.

Hamner et al., "Custom logic helps clear LAN traffic bottlenecks", Electronic Design, vol. 36, No. 2, Jan. 21, 1988, pp. 119-122.

*Primary Examiner*—Benedict V. Safourek
*Assistant Examiner*—Dang Ton
*Attorney, Agent, or Firm*—Paul W. Martin; Gregory P. Gadson

[57] ABSTRACT

To improve the throughput of bridges in a multiple ring token ring network, External Copy Hardware (ECH) is provided for each source routing bridge to determine when a frame is to be copied as a candidate for forwarding to another ring by a given bridge. Each frame may contain a Routing Information Field (RIF), which the ECH searches for Segment Numbers in the RIF that are compared with host processor developed Primary Segment Numbers (each representing a primary ring number and a bridge number) and Secondary Segment Numbers (each representing an alternate ring number and a bridge number). The ECH uses the results of the comparisons along with a look-up table and a Routing Control Word (also present in the RIF) to determine if the frame under consideration is to be copied by a Protocol Handler (which interfaces with the ECH) and forwarded by the corresponding bridge to another ring. During the process of making a copy or non-copy decision, the frames are scanned unidirectionally, and the decision is made "on the fly", thereby increasing operation speed.

5 Claims, 4 Drawing Sheets

ROUTING CONTROL WORD

| BBB | LLLLL | D | LF | RRR |
|-----|-------|---|----|-----|
| 502 | 504   | 506 | 508 | 510 |

| B | D | COMPARE REGISTER |
|---|---|------------------|
| 0 | 0 | PSN |
| 0 | 1 | SSN |
| 1 | 0 | SSN |
| 1 | 1 | PSN |

| B | D | COMPARE REGISTER | SEGMENT NUMBER MATCH FOUND IN RIF | COPY DECISION |
|---|---|------------------|-----------------------------------|---------------|
| 0 | 0 | PSN | NO_MATCH | NOT_COPY |
| 0 | 0 | PSN | MATCH    | COPY |
| 0 | 1 | SSN | NO_MATCH | NOT_COPY |
| 0 | 1 | SSN | MATCH    | COPY |
| 1 | 0 | SSN | NO_MATCH | COPY |
| 1 | 0 | SSN | MATCH    | NOT_COPY |
| 1 | 1 | PSN | NO_MATCH | COPY |
| 1 | 1 | PSN | MATCH    | NOT_COPY |

METHOD AND APPARATUS FOR SOURCE ROUTING BRIDGING

This is a continuation of co-pending application Ser. No. 07/382,605 filed on Jul. 19, 1989 now abandoned.

BACKGROUND OF THE INVENTION

The present invention generally relates to computer communication networks, and more specifically to a method and apparatus for forwarding information frames from one network—particularly a token ring network—to another in a multiple network communication system. The present invention is an attempt to replace or improve upon so-called "brute force" methods of source routing bridging which require storage of frame information and more than one scan of that information for deciding if the frame is to be forwarded to another network, thus increasing processing time and circuit complexity. In source routing bridging the source of the frame, such as a workstation attached to a network, determines where the frame is to be routed (in contrast to transparent bridging, where the bridge determines where the frame is to be routed).

SUMMARY OF THE INVENTION

It is an object of the present invention to provide a scheme for source routing with improved speed.

It is another object of the present invention to provide such a scheme with "on the fly" processing of frame forwarding information in order to increase speed and reduce complexity of the operation.

It is yet another object of the present invention to make such a scheme generally compatible with networks using a source routing algorithm.

It is still a further object of the present invention to make such a scheme configurable in a manner which is compatible with a standard Protocol Handler.

An additional object of the present invention is to provide a scheme satisfying the above objects which is efficiently implemented in hardware.

Broadly speaking, there is provided for a multiple network communication system, a method for determining when to copy frames from a network which are candidates for forwarding through a bridge to another network. The method includes the steps of defining Segment Numbers which have a network number and a bridge number, defining at least a Primary Segment Number having a primary network number and a bridge number corresponding to each bridge, defining a Routing Information Field for inclusion in each frame having a Routing Control Word and at least a Segment Number, and deciding whether to copy a frame by an interfacing Protocol Handler for forwarding through a bridge, based on comparisons between the Primary Segment Number and the Segment Numbers, and specific information in a look-up table identified by the Routing Control Word, the Routing Information Field being unidirectionally scanned during performance of the method.

The details of the present invention will be revealed in the following description with reference to the attached drawings.

DESCRIPTION OF THE PREFERRED EMBODIMENT

Figure 1:
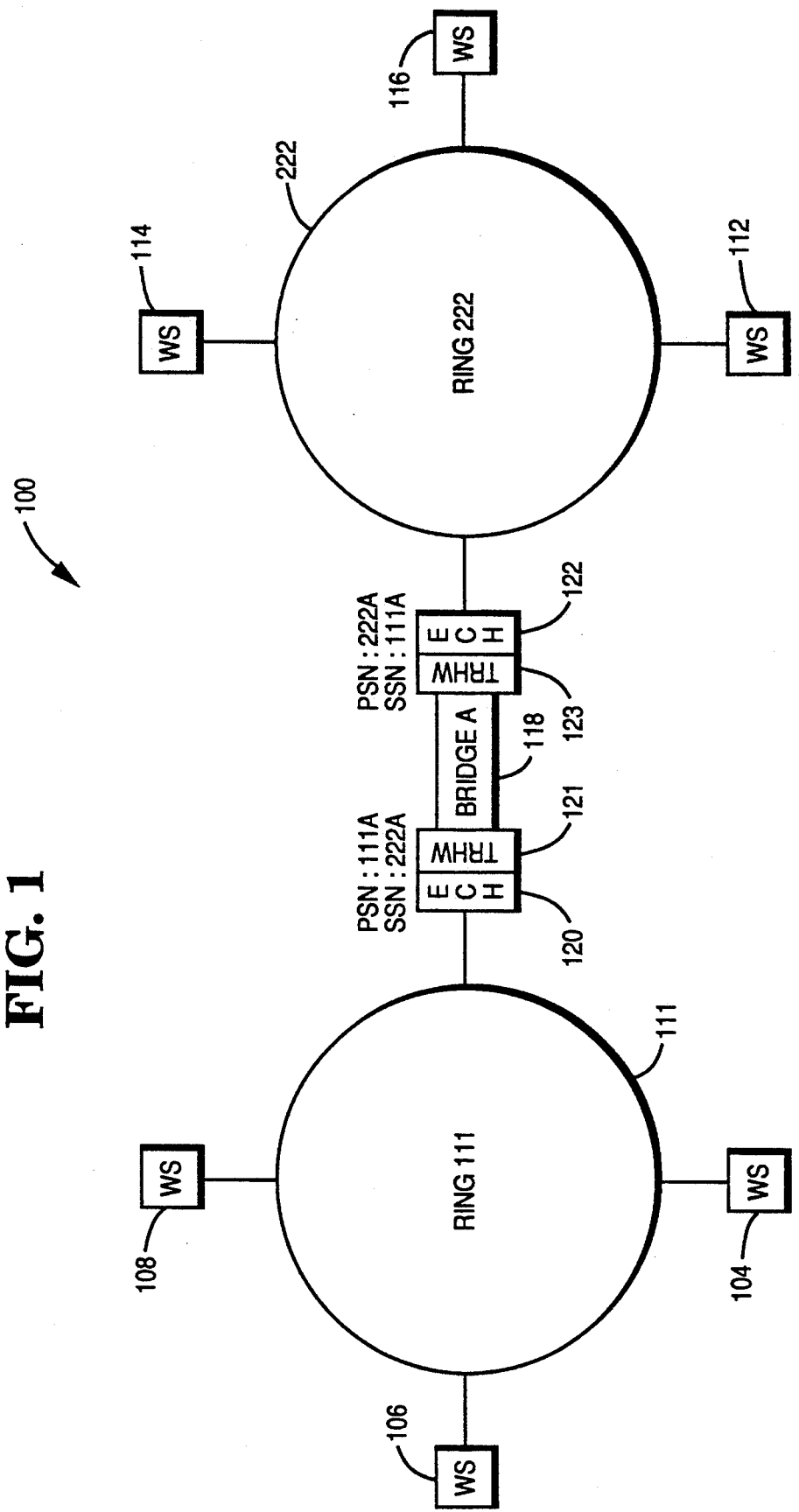
FIG. 1 is a schematic diagram of a multiple ring, token ring network with source routing bridging.

Since the invention resides primarily in the novel structure combination and the method of operation of well-known computer circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of these systems have been appropriately consolidated and simplified to stress those portions pertinent to the present invention.

In FIG. 1 a multiple ring token ring network 100 is shown capable of communication between the two rings shown. Although only two token rings are shown, it should be understood that any number of token rings may be included in the network without affecting the nature of the present invention. Briefly described, a token ring 111 has workstations (labeled WS) 104–108 attached thereto, and functions in a manner well known in the art. Another ring 222 is also shown, and has workstations 112–116 attached thereto.

For routing of information between the rings 111 and 222, a bridge 118 labeled "Bridge A" is attached therebetween. Also, two ECH boards 120 and 122 and two token ring hardware boards (TRHW) 121 and 123 are attached to the bridge 118, which boards 120 and 122 decide when a frame is to be copied by the boards 121 and 123, and forwarded by the bridge 118.

The bridge 118 contains a token ring interface which includes bridge software for performing the actual bridging. The token ring hardware 121 and 123 contains a Protocol Handler or Adapter for each token ring, which controls the token ring (but not bridging) operation according to the communication system protocol (the specific rules of communication), and copies frames which are a candidate for bridge forwarding when instructed to do so by the corresponding ECH board. In the preferred embodiment, the Protocol Handler is subsumed by the commercially available TMS380 chip set, made by Texas Instruments for implementation of the IEEE Standard Number 802.5 Token Ring Protocol. The bridge 118 follows the IEEE 802.5 Protocol, and is therefore easily constructed with reference to that standard by one skilled in the art. Both the IEEE Standard Number 802.5 and the Texas Instruments TMS380 User's Manual are hereby expressly incorporated by reference. The present invention is adaptable to operate with other chip sets and other protocols.

To facilitate a copy decision, the present invention novelly defines for each ECH board, a Primary Segment Number (PSN) representing a primary ring number plus the corresponding bridge number, and a Secondary Segment Number (SSN) representing an alternate ring number plus the corresponding bridge number. Thus it is shown in FIG. 1 that the PSN for the ECH 120 is 111A, meaning that the primary ring for the ECH 120 is ring 111, while the corresponding bridge is bridge A. The SSN designation of 222A for the ECH board 120 means that the alternate ring number is ring 222 and the bridge is bridge A. From the above it should be understood that the PSN and SSN for the ECH board 122 are 222A and 111A, respectively. The use of the PSNs and SSNs will be detailed later.

The frames in the present communication system can either be of the broadcast or non-broadcast type. Broadcast frames are receivable by all of the workstations WS in a communication system. Typically, a source station sending a broadcast frame seeks information from certain other workstations. The other workstations "listen" to determine if they are the intended recipients of the request for information. The appropriate receiver stations attach the requested information to the token frame and return it back to the source workstation.

For broadcast frames, the bridges must determine the appropriate routing between rings and insert that information in the frame prior to forwarding.

Non-broadcast frames are frames where the routing is predetermined by the source. Therefore, no routing information need be inserted by the bridges. The categorizing of frames as either broadcast or non-broadcast is conventional terminology in the computer networking field.

In general, the communication system 100 operates as follows. A workstation WS (106 for example) attached to token ring 111 decides to send a frame of information which is to be routed to ring 222 and received by workstation 116. The WS 106 waits for a free token and attaches the frame to it. The frame is in standard form and includes routing information field having a routing control word (all according to IEEE Standard Number 802.5, to be discussed later).

The ECH receives the frame just as a workstation attached to the ring 111 and must decide, based upon the information in the frame whether to forward the frame to the Protocol Handler in the TRHW 121 for copying. If the ECH decides that the frame is not to be copied by the Protocol Handler, the frame will remain on ring 111, and will not be forwarded to ring 222 by the bridge 118.

If the ECH decides that the frame is a proper candidate for forwarding, then it instructs the Protocol Handler to copy the frame so that the bridge may forward it to the ring 222. Once the frame is forwarded to the ring 222 it continues around the ring 222 in a manner well known in the art. After the WS 116 receives the frame, it sends an acknowledgment frame which is eventually received by the ECH 122, which then must decide based upon the frame information whether to instruct the TRHW to copy the frame in order that the bridge 118 can forward the acknowledgment frame to ring 111.

The present invention is then a method for deciding when a frame is to be copied by a Protocol Handler as a candidate for forwarding by the bridge, and involves a novel arrangement of the ECHs including an algorithm for making copy decisions based upon a unidirectional parsing of the frames while comparing frame information to the PSNs or SSNs. The novel PSN and SSNs represent for each ECH board, a ring from whence the frame under consideration came plus the bridge between that ring and the ring on the other side of the bridge, and the SSN represents the ring on the other side plus the same bridge.

As will be more fully described later, in conjunction with FIG. 4, each frame includes a Routing Information Field with the segments of the route that the frame is to take to its destination (the segments referred to as "Segment Numbers"). Each Segment Number corresponds to the route across one bridge. Thus, when a frame arrives at the ECH 120, the PSN for the ECH 120 is compared to each Segment Number to see if the bridge 118 is on the route, and if it is, the frame is copied. After the message is received at its destination and an acknowledgment is sent, the acknowledgment frame has the same Segment Numbers. However, since the route is reversed, when the frame arrives at ECH 122, it is the SSN rather than the PSN that is compared to each Segment Number to see if the bridge 118 at ECH 122 is on the route.

Figure 2:
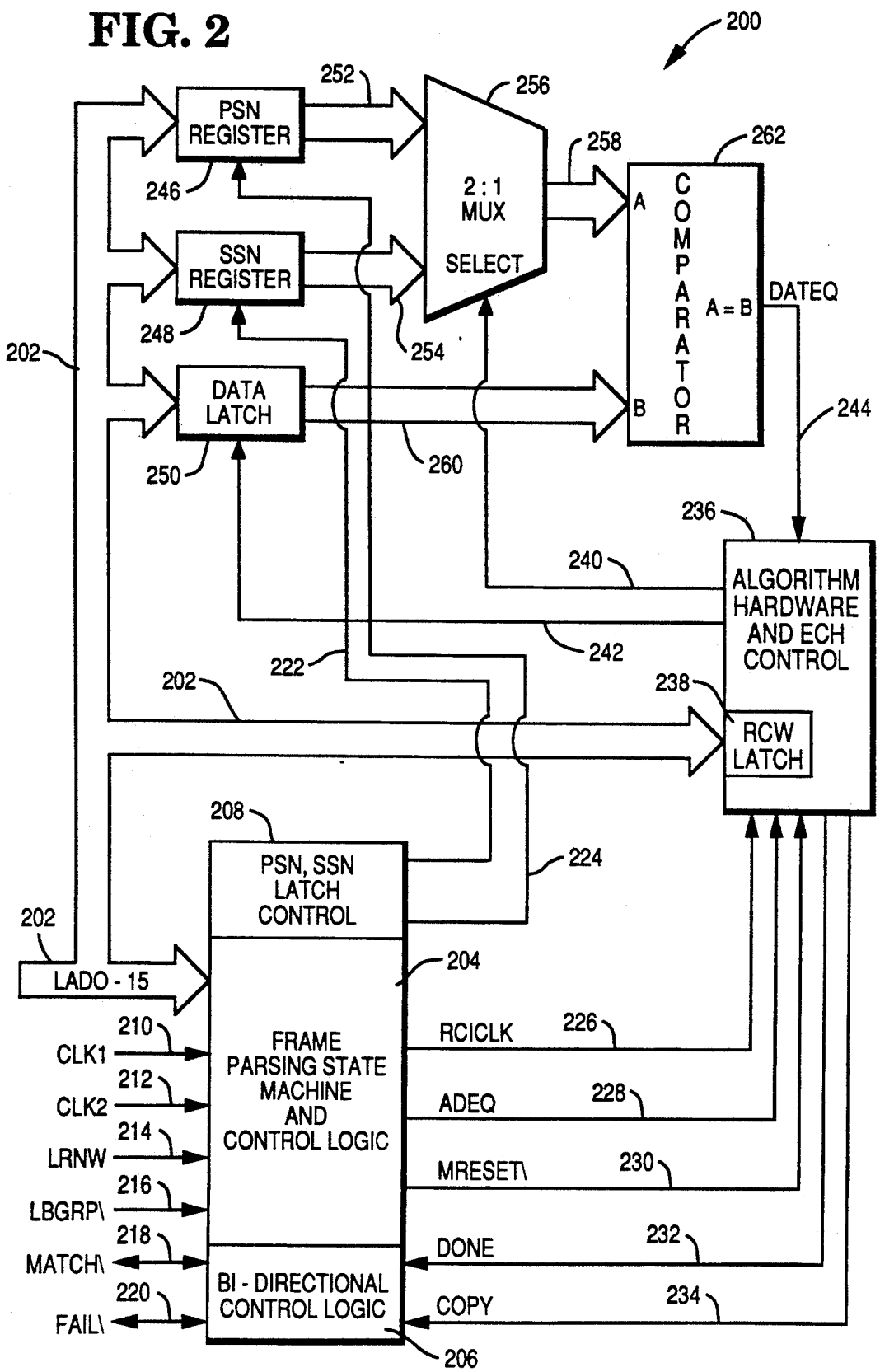
FIG. 2 is a schematic diagram of the presently inventive External Copy Hardware (ECH).
Figure 3:
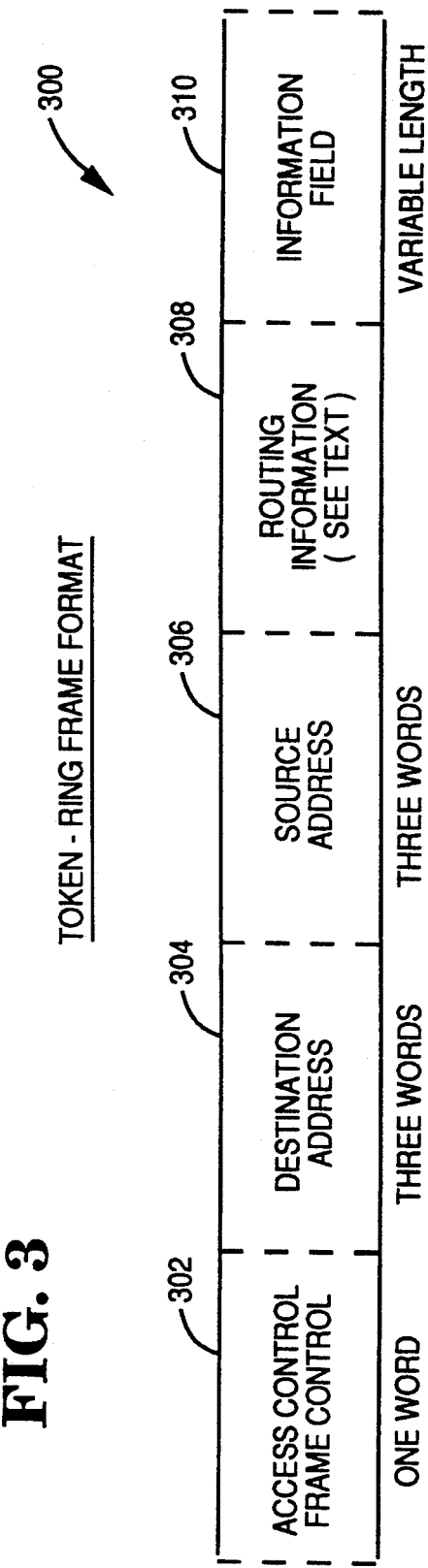
FIG. 3 is a frame format usable with the present invention.

Turning to FIG. 2, External Copy Hardware (ECH) 200 is shown. The ECH performs the functions described in connection with FIG. 1 for the ECH boards 120 and 122, plus additional functions in accordance with the present invention to be described shortly. In the preferred embodiment, two ECH boards are present for every bridge in the system. A bus 202 transports two bytes LAD0–15 of a frame at a time from an associated token ring. A Frame Parsing State Machine and Control Logic Unit (FPSM) 204 receives the frames on the bus 202. The FPSM 204 is connected to a Bi-Directional Control Logic Unit (BDCL) 206 and latch control unit 208, both to be explained later. The frame format is shown in FIG. 3, with a typical frame designated generally as 300. The frame 300 contains 1 word (2 bytes) of an access control/frame control field used to manage the physical layer protocol, 3 words representing a destination address 304 (a unique 48-bit value assigned to each workstation ring interface board in accordance with IEEE standards) for the frame, 3 words representing a source address 306, the most significant bit of which indicates the presence (1) or non-presence (0) of a Routing Information Field (RIF) 308, and an information field 310, variable in length which contains the actual data to be transmitted.

Figure 4:
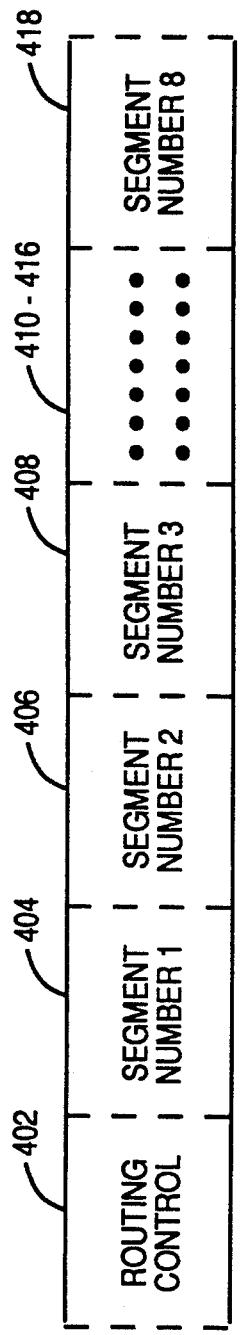
FIG. 4 is a format for a Routing Information Field of a frame.

The RIF format 308 is shown in detail in FIG. 4. It contains a Routing Control Word (RCW) 402 and up to eight Segment Numbers 404–418. Each Segment Number represents a ring number and a bridge number. Collectively, the Segment Numbers specify all of the forwarding paths for the frame under consideration. This is especially important where the communication system has several token rings. The RCW 402 is only used by the ECH when present in the RIF, as indicated by the most significant bit of the source address.

Figures 5, 6, 7:
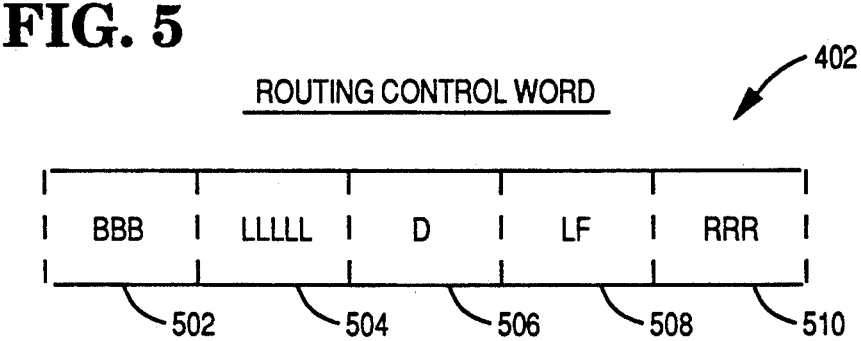
FIG. 5 is a format for a Routing Control Word in the Routing Information Field.
FIG. 6 is a table for directing the comparison between Primary Segment Numbers and Secondary Segment Numbers, and other Segment Numbers.
FIG. 7 is a table for directing the ECH to copy (for forwarding through the corresponding bridge) or not copy (for remaining on the current ring) a frame under consideration.

The format for the RCW 402 is shown in FIG. 5. It contains three broadcast bits BBB numbered 502, the most significant of which determines whether the frame is a broadcast frame, five bits LLLLL numbered 504 which determine the length of the RIF (indicates the number of bytes in the RIF), a direction bit D numbered 506 for determining the direction of travel of the frame of data, with "0" indicating a forward direction of the frame of data and "1" indicating a reverse direction of the frame of data, two bits LF numbered 508 for indicating the maximum size information field which may be transmitted, and three reserved bits RRR numbered 510. It should be understood that the token ring frame format (FIG. 3), the routing information field format (FIG. 4), and the routing control word format (FIG. 5), are in accordance with the IEEE Standard Number 802.5.

The combination of the bits in the RCW determine whether the ECH compares the PSN or the SSN with the Segment Numbers in accordance with a table in FIG. 6. The SSN rather than the PSN is used such as when an acknowledgment frame is sent by a destination workstation. The usage of the PSN and SSN is reversed since the forwarding path is reversed. In that situation, the PSN used to make the copy/non-copy decision for the initial frame equals the SSN used to make the copy/non-copy decision for the acknowledgment frame, so that the bridge copying and forwarding hardware acts identically in both cases.

Referring to FIG. 6, if the frame is not a broadcast frame, and the frame is traveling in the forward direction, the PSN is to be compared with the Segment Numbers.

The table in FIG. 7, which subsumes the table in FIG. 6, determines whether the ECH will copy the frame under examination, and will be discussed in more detail later.

Returning to FIG. 2, control lines 210-220 are connected between the Protocol Handler and units 204 and 206. The FPSM 204, a state machine connected to control logic, has flip-flops, the outputs of which determine the status of a frame parsing process. For example, the state of the FPSM 204 indicates when to look for a RIF in a frame, and when a RCW is to be latched. The control logic outputs the signals RCICLK, ADEQ and MRESET in response to the state. Also, when a frame is determined to have no RIF, the state machine is reset, otherwise the state changes and is reset after the MATCH and FAIL signals are produced.

Clocking signals CLK1 and CLK2 on input lines 210 and 212, respectively, control the timing of the FPSM 204. The signal LRNW on input line 214 represents either a memory read (logical 1) or memory write (logical 0) operation. The signal LBGRP on input line 216, which is active low, indicates when the Protocol Handler is executing a memory bus cycle. The signals MATCH and FAIL on lines 218 and 220, respectively, when received from the Protocol Handler by the BDCL 206 cause resetting of the FPSM 204 and an algorithm hardware and ECH control unit (AHECHC) 236 (via the MRESET signal on line 230).

When the aforementioned units are reset, the FPSM 204 begins receiving frame information on the bus 202 and sends a logic high ADEQ signal on line 228 to the AHECHC 236. The signal ADEQ is placed in the logic high state for the receipt of each word by the ECH in the token ring frame. While this is occurring, the FPSM 204 unidirectionally scans (or "parses") the frame for the source address 306 in the frame. The first bit of the source address indicates whether an RIF is present in the frame. If no RIF is present, the FPSM 204 automatically defaults to a No Copy mode and outputs the signal FAIL indicating the same on line 220 to the Protocol Handler. When an RIF is present in the frame, further operations must occur to determine whether to copy the frame for forwarding.

When the first bit of the source address is a logic one, the presence of an RIF is indicated, and the signal RCICLK on 226 is made active once the receipt of the RCW begins. Also, the signal ADEQ is made active while the bytes of the RIF are being received.

The RCW is latched into the RCW latch 238 while the signal RCICLK is active. As discussed previously, the B (most significant broadcast bit) and D bits in the RCW are used by the AHECHC 236 (in accordance with the table in FIG. 6) to output a select signal on line 240 which indicates to a 2:1 multiplexer (MUX) 256 whether the PSN (stored in a PSN register 246) or the SSN (stored in an SSN register 248) are to be compared with the successive Segment Numbers. The Segment Numbers are successively latched into a data latch 250 under the control of an enabling signal output by the AHECHC 236 on line 242. The PSN and SSN registers 246 and 248 are controlled by the PSN, SSN latch control 208, which sends enabling signals to either the PSN or SSN register (for loading with the PSN and SSN, respectively) when the signal LRNW is low and an address being presented on the bus 202 matches the address of a corresponding register. The contents of the registers 246 and 248 are also available on the input lines 252 and 254 of the multiplexer 256.

The comparison between the Segment Numbers and the PSN or SSN is performed by the comparator 262, which outputs the result of that comparison in the form of a signal DATEQ via line 244 to the AHECHC 236. When equivalence is determined by the comparator 262 DATEQ is driven high, while non-equivalence drives DATEQ low. The AHECHC uses the value of DATEQ and the RCW in accordance with the table in FIG. 7 to make a copy decision. The table in FIG. 7 along with the other decision logic in the AHECHC is implemented with logic gates.

For example, if the frame is not a broadcast frame (signified by a 0 in the "B" column) and the frame is traveling in the forward direction (indicated by the 0 in the "D" column) the multiplexer 256 will select the PSN register 246 to be compared with the Segment Numbers from the data latch 250 in the comparator 262. For the specific case above the AHECHC 236 will drive the signal COPY on line 234 high, indicating a copy decision whenever the comparator signifies a match, and conversely, COPY will be driven low, indicating a no-copy decision when no match is found.

When all of the Segment Numbers have been compared by the comparator 262 the AHECHC 236 outputs a logic high version of the signal DONE on line 232, which causes the BDCL 206 to convert and output the signal COPY in the form of the MATCH signal if a copy decision is made, and the FAIL signal if a no-copy decision is made. All parsing of the frame information is unidirectional. The timing of the BDCL 206 is controlled by the clock signals CLK1 and CLK2 received via the FPSM 204. Also, the BDCL 206 has tri-state output devices which communicate MATCH and FAIL signals to the Protocol Handler when the signal LRNW (received via the FPSM 204) is low, and are inhibited from sending the MATCH and FAIL signals when LRNW is high.

As another example of the process, again refer to FIG. 7. If the frame is a broadcast frame and the frame is traveling in the forward direction, the Segment Numbers are compared with the SSN and a copy decision will be made when the Segment Number and the SSN do not match, while a no-copy decision will be made when the SSN and Segment Number match.

All copies are performed by the Protocol Handler in a manner known by those skilled in the art, and thus will not be detailed here.

In accordance with the foregoing, the present invention significantly departs from the prior by allowing on-the-fly copy and non-copy decisions. To summarize, when a source station sends a frame which must forwarded from one token ring to another token ring, the frame is presented to the ECH along with the corresponding PSN and SSN for storage in the ECH PSN and SSN registers. The ECH parses the frame for the RIF from which a RCW is obtained. The RCW indicates whether the Segment Numbers (information indicating the frame forwarding paths) are to be compared to the PSN or the SSN. The ECH parses through the Segment Numbers in one direction without needing to store them, while comparing each Segment Number to the PSN or SSN as dictated. The results of each comparison are interpreted in accordance with the Table in FIG. 7 to indicate via MATCH and FAIL signals whether the Protocol Handler is to copy the frame under consideration. No Segment Numbers need be stored after their comparisons since the comparisons are contemporaneously made, and a copy/non-copy decision need not depend on a previous comparison.

Variations and modifications to the present invention are possible given the above disclosure. However, all such variations and modifications are intended to be within the scope of the invention claimed by this letters patent.

For example, the invention is not restricted to use with token ring networks, and may be used with other types of networks which use source routing algorithms. Also, one ECH circuit rather than two can be used for each bridge with some modifications to the source routing algorithm. Additionally, the invention need not be confined to being implemented on a pluggable board, but may also be implemented using, inter alia, discrete logic, Application Specific Integrated Circuit (ASIC) and Programmable Array Logic (PAL) technologies.

We claim:

1. In a multiple network communication system, a method for determining when to copy frames from a network which are candidates for forwarding through a bridge to another network, comprising the steps of:
   defining Segment Numbers which comprise a network number and a bridge number;
   defining at least a Primary Segment Number comprising a primary network number and a bridge number corresponding to each bridge;
   defining a Routing Information Field for inclusion in each frame comprising a Routing Control Word and at least a Segment Number;
   unidirectionally scanning each frame, including the substeps of parsing the frame for the Routing Information Field, reading the Routing Control Word from the Routing Information Field, and parsing through the Segment Numbers in the frame in one direction; and
   deciding on-the-fly whether to copy a scanned frame by an interfacing Protocol Handler for forwarding through a bridge, including the substeps of contemporaneously comparing said Primary Segment Number with each of said Segment Numbers to achieve a predetermined result, and interpreting the resulting independently of previous comparisons as being a copy or no-copy decision using specific information in a look-up table identified by said Routing Control Word.

2. The method for determining when to copy frames in claim 1 wherein said networks are of the token ring type.

3. In a multiple network communication system, a method for determining when to copy frames from a network which are candidates for forwarding through a bridge to another network, comprising the steps of:
   defining Segment Numbers which comprise a network number and a bridge number;
   defining at least a Primary Segment Number comprising a primary network number and a bridge number corresponding to each bridge;
   defining at least a Secondary Segment Number comprising an alternate network number and a bridge number corresponding to each bridge;
   defining a Routing Information Field for inclusion in each frame comprising a Routing Control Word and at least a Segment Number;
   unidirectionally scanning each frame, including the substeps of parsing the frame for the Routing Information Field, reading the Routing Control Word from the Routing Information Field, and parsing through the Segment Numbers in the frame in one direction; and
   deciding on-the-fly whether to copy a scanned frame by an interfacing Protocol Handler for forwarding through a bridge, including the substeps of determining from the Routing Control Word whether the Primary Segment Number or the Secondary Segment Number is to be compared with each of the Segment Numbers, contemporaneously comparing said Primary Segment Number or said Secondary Segment Number with each of said Segment Numbers to achieve a predetermined result, and interpreting the result independently of previous comparisons as being a copy or no-copy decision; using specific information in a look-up table identified by said Routing Control Word.

4. The method for determining when to copy frames in claim 3 wherein said networks are of the token ring type.

5. A multiple network communication system comprising:
   a bridge, coupled between first and second networks, which forwards frames of data from one network to the other; and
   a device connected between the bridge and said first network, wherein said device:
   scans each frame of data while each frame of data is on the first network;
   parses each frame for a Routing Information Field;
   reads a Routing Control Word from the Routing Information Field;
   parses through Segment Numbers in the frame in one direction; 'identifies on-the-fly frames of data destined for the second network; and
   controls the forwarding of identified frames of data from the first network to the bridge;
   said device includes:
   a. logic circuitry which contemporaneously compares a Primary Segment Number with each of said Segment Numbers to achieve a predetermined result, and interprets the result independently of previous comparisons as being a copy or no-copy decision;

b. look-up tables used by said logic circuitry to determine whether the decision is a copy or no-cop decision; and c. a state machine which receives the copy decisions from the logic circuitry and provides signals to control the forwarding of identified frames of data.

* * * * *

UNITED STATES PATENT AND TRADEMARK OFFICE
CERTIFICATE OF CORRECTION

PATENT NO. : 5,327,431
DATED : July 5, 1994
INVENTOR(S) : Theodore Heske, III et al.

It is certified that error appears in the above-indentified patent and that said Letters Patent is hereby corrected as shown below:

Column 7, line 68, delete "resulting" and substitute --result--.

Column 8, lines 40 and 41, after "decision" delete ";".

Column 8, line 58, after "direction;" delete "/".

Column 8, line 58, start a new paragraph at "identifies on-the-fly frames of data destined for the second network; and".

Signed and Sealed this

Twenty-ninth Day of August, 1995

Attest:

BRUCE LEHMAN

Attesting Officer     Commissioner of Patents and Trademarks